(12) United States Patent
Behnen et al.

(10) Patent No.: US 7,788,269 B2
(45) Date of Patent: Aug. 31, 2010

(54) INTEGRATION OF PREDEFINED MULTI-DIMENSIONAL AND FLEXIBLY-ORDERED DYNAMIC SEARCH INTERFACES

(75) Inventors: Marion Behnen, Austin, TX (US); Qi Jin, San Jose, CA (US); Timo Pfahl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/693,720

(22) Filed: Mar. 30, 2007

(65) Prior Publication Data

US 2008/0243779 A1  Oct. 2, 2008

(51) Int. Cl.
*G06F 17/30* (2006.01)
(52) U.S. Cl. ........................ 707/754; 715/526
(58) Field of Classification Search ........................ None
See application file for complete search history.

(56) References Cited

U.S. PATENT DOCUMENTS

| | | | |
|---|---|---|---|
| 6,449,622 B1 * | 9/2002 | LaRue et al. | 707/8 |
| 6,671,680 B1 | 12/2003 | Ivamoto et al. | |
| 6,831,668 B2 | 12/2004 | Cras et al. | |
| 6,931,418 B1 * | 8/2005 | Barnes | 707/101 |
| 7,007,029 B1 | 2/2006 | Chen | |
| 7,120,646 B2 | 10/2006 | Streepy, Jr. | |
| 7,130,836 B2 | 10/2006 | Grosser et al. | |
| 2001/0018690 A1 * | 8/2001 | Tung Ng et al. | 707/103 Y |
| 2002/0087540 A1 * | 7/2002 | Ashida et al. | 707/8 |
| 2002/0087579 A1 | 7/2002 | Chasanoff et al. | |
| 2004/0044661 A1 | 3/2004 | Allen et al. | |
| 2004/0138935 A1 | 7/2004 | Johnson et al. | |
| 2004/0139102 A1 | 7/2004 | Vierich et al. | |
| 2005/0080770 A1 | 4/2005 | Lueder et al. | |
| 2005/0283494 A1 | 12/2005 | Colossi et al. | |
| 2006/0004703 A1 | 1/2006 | Spivack et al. | |
| 2006/0026180 A1 | 2/2006 | Kres | |
| 2006/0053175 A1 | 3/2006 | Gardner et al. | |
| 2006/0074836 A1 | 4/2006 | Gardner et al. | |
| 2006/0167924 A1 * | 7/2006 | Bradlee et al. | 707/102 |

(Continued)

FOREIGN PATENT DOCUMENTS

JP   411015897 A   1/1999

OTHER PUBLICATIONS

Torsten Priebe, Gunther Pernul, "Towards Integrative Enterprise Knowledge Portals", Wege 02 Portal Server Techology, IEEE, Internet Computing, May/Jun. 2002.

(Continued)

*Primary Examiner*—John R Cottingham
*Assistant Examiner*—Nicholas E Allen
(74) *Attorney, Agent, or Firm*—Patterson & Sheridan, LLP

(57) ABSTRACT

A method, computer program product, and system for integrating faceted and predefined multi-dimensional search interfaces are provided. The method, computer program product, and system provide for displaying a first set of results from a search request in a faceted search interface and a second set of results from the search request in a predefined multi-dimensional search interface, and responsive to a user action in the predefined multi-dimensional search interface affecting a scope of the search request, synchronizing the faceted search interface with changes in the predefined multi-dimensional search interface without requiring a separate user action in the faceted search interface.

19 Claims, 8 Drawing Sheets

U.S. PATENT DOCUMENTS

| | | | |
|---|---|---|---|
| 2006/0218157 A1 | 9/2006 | Sourov et al. | |
| 2006/0218159 A1 | 9/2006 | Murphy et al. | |
| 2006/0253584 A1* | 11/2006 | Dixon et al. | 709/225 |
| 2006/0271565 A1 | 11/2006 | Acevedo-Aviles et al. | |
| 2006/0271568 A1 | 11/2006 | Balkir et al. | |
| 2006/0288039 A1 | 12/2006 | Acevedo-Aviles et al. | |
| 2007/0162481 A1* | 7/2007 | Millett | 707/101 |
| 2008/0005104 A1* | 1/2008 | Flake et al. | 707/6 |

OTHER PUBLICATIONS

JP Abstract, JP411015897A.txt; "Interactive Data Analysis Supporting Device and Medium Recording Interactive Data Analysis Supporting Program"; Jan. 22, 1999, Fujitsu Limited.

Rtolap; Wikipedia the free encyclopedia, "RTOLAP—Real Time OLAP".

Dossier No. ARC 920050081, "Online Analytic Processing in the Presence of Uncertainties", 3 pages.

Toon Calders, et al., "Searching for Dependencies At Multiple Abstraction Levels, ACM Transactions on Database Systems", vol. 27, No. 3, Sep. 2002, pp. 229-260.

Bing Liu, et al., "Rule Interestingness Analysis Using OLAP Operations," KDD 2006, Aug. 20-23, 2006, pp. 297-306, Philadelphia, Pennsylvania, ACM 1-59593-339-5/06/0008.

Alfredo Cuzzocrea, "Providing Probabilistically-Bounded Approximate Answers to Non-Holistic Aggregate Range Queries in OLAP", pp. 97-106, DOLAP 2005, Nov. 4-5, 2005, Breman, Germany, ACM 1-59593-162-7/05/0011.

Riadh Ben Messaoud et al., "Enhanced Mining of Association Rules From Data Cubes", pp. 11-18, DOLAP 2006, Nov. 10, 2006, Arlington, US, ACM 1-59593-530-4/06/0011.

Zhang et al., "Cardinality-Based Inference Control in OLAP Systems: An Information Theoretic Approach", pp. 59-64m DOLAP 2004, Nov. 12-13, 2004, Washington, D.C., Copyright 2004 ACM 1-58113-977-2/04/0011.

Josiane Mothe et al., "DocCube: Multi-Dimensional Visualisation and Exploration of Large Document Sets", Institute de Recherche en Informatique de Toulouse, pp. 1-16.

* cited by examiner

INTEGRATION OF PREDEFINED MULTI-DIMENSIONAL AND FLEXIBLY-ORDERED DYNAMIC SEARCH INTERFACES

FIELD OF THE INVENTION

The present invention relates generally to flexibly-ordered dynamic as well as predefined multi-dimensional search interfaces.

BACKGROUND OF THE INVENTION

For certain types of data, such as sales and marketing data, a flexibly-ordered dynamic search interface and a predefined multi-dimensional search interface may be simultaneously used to analyze the data. An example of a flexibly-ordered dynamic search interface is a faceted interface where data is categorized into facets for analysis. An example of a predefined multi-dimensional search interface is an online analytical processing (OLAP) interface where measures are derived from data and loaded into, for instance, a predefined cube structure for analysis.

Analysis of data using both flexibly-ordered dynamic and predefined multi-dimensional search interfaces, however, has been hampered by a lack of complete integration between the interfaces. For instance, changes made in the predefined multi-dimensional search interface are not reflected in the flexibly-ordered dynamic search interface. This lack of integration could lead to asynchronous behavior from a user's point of view and make it difficult for the user to analyze the data.

SUMMARY OF THE INVENTION

A method, computer program product, and system for integrating faceted and predefined multi-dimensional search interfaces are provided. The method, computer program product, and system provide for displaying a first set of results from a search request in a faceted search interface and a second set of results from the search request in a predefined multi-dimensional search interface, the second set of results correlating to the first set of results, the first set of results being retrieved from a first data source and the second set of results being retrieved from a second data source separate from the first data source, the first data source and the second data source being created from a same data set or correlated data sets, and responsive to a user action in the predefined multi-dimensional search interface affecting a scope of the search request, synchronizing the faceted search interface with changes in the predefined multi-dimensional search interface without requiring a separate user action in the faceted search interface.

DETAILED DESCRIPTION

The present invention generally relates to flexibly-ordered dynamic and predefined multi-dimensional search interfaces. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

A flexibly-ordered dynamic search interface is sometimes used in conjunction with a predefined multi-dimensional search interface to analyze data relating to, for instance, sales and marketing. One example of a flexibly-ordered dynamic search interface is a faceted interface in which a data set is categorized into facets for analysis. An example of a predefined multi-dimensional search interface is an online analytical processing (OLAP) interface in which measures are derived from the data set and loaded into data structures with interconnected dimensions, such as cubes or multi-dimensional arrays, for analysis.

Figure 1:
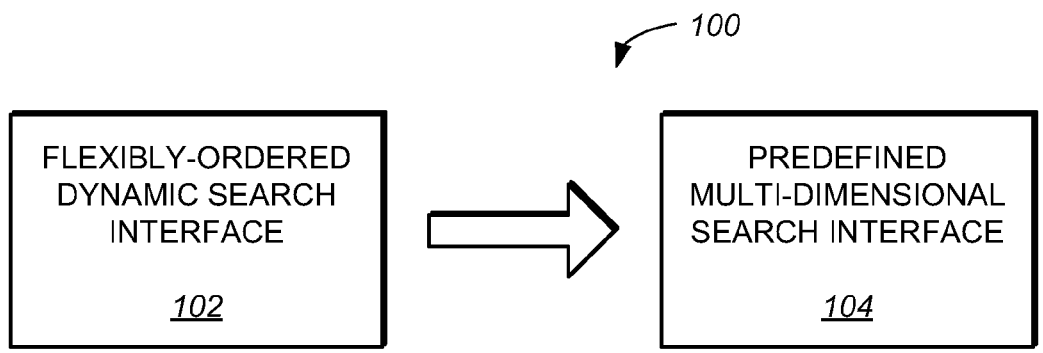
FIG. 1 illustrates a block diagram of a prior art application.

Simultaneous use of flexibly-ordered dynamic and predefined multi-dimensional interfaces, however, has been limited by a lack of complete integration between the two interfaces. Illustrated in FIG. 1 is a prior art application 100 that provides both a flexibly-ordered dynamic search interface 102 and a predefined multi-dimensional search interface 104. As illustrated in FIG. 1, only changes invoked in the flexibly-ordered dynamic search interface 102, such as a user clicking on a facet, will propagate to the predefined multi-dimensional search interface 104, not the other way around.

Hence, if changes are invoked in the predefined multi-dimensional search interface 104, such as user selection of a drill-down operation, those changes will not be reflected in the flexibly-ordered dynamic search interface 102. From the user's point of view, interfaces 102 and 104 will become inconsistent, which could make it difficult for the user to correctly analyze the underlying data.

Figure 2:
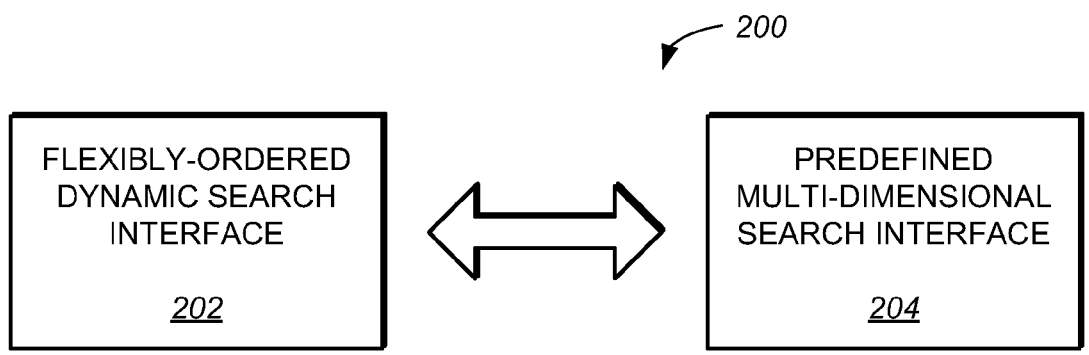
FIG. 2 depicts a block diagram of an application according to an implementation of the invention.

FIG. 2 depicts an application 200 according to an implementation of the invention. Application 200 provides a flexibly-ordered dynamic search interface 202 and a predefined multi-dimensional search interface 204. Instead of the one-way interconnection from flexibly-ordered dynamic search interface 102 to predefined multi-dimensional search interface 104 illustrated in FIG. 1, there is a two-way interconnection between flexibly-ordered dynamic search interface 202 and predefined multi-dimensional search interface 204 in FIG. 2.

Thus, if a user invokes changes in the flexibly-ordered dynamic search interface 202 by, for example, clicking on a facet or entering a natural language search term, then those changes will be propagated to the predefined multi-dimensional search interface 204. In addition, if the user invokes changes in the predefined multi-dimensional search interface 204 by, for example, selecting a drill-down operation, a drill-up operation, or a slice-and-dice operation, then those changes will be propagated to the flexibly-ordered dynamic search interface 202.

Figure 3:
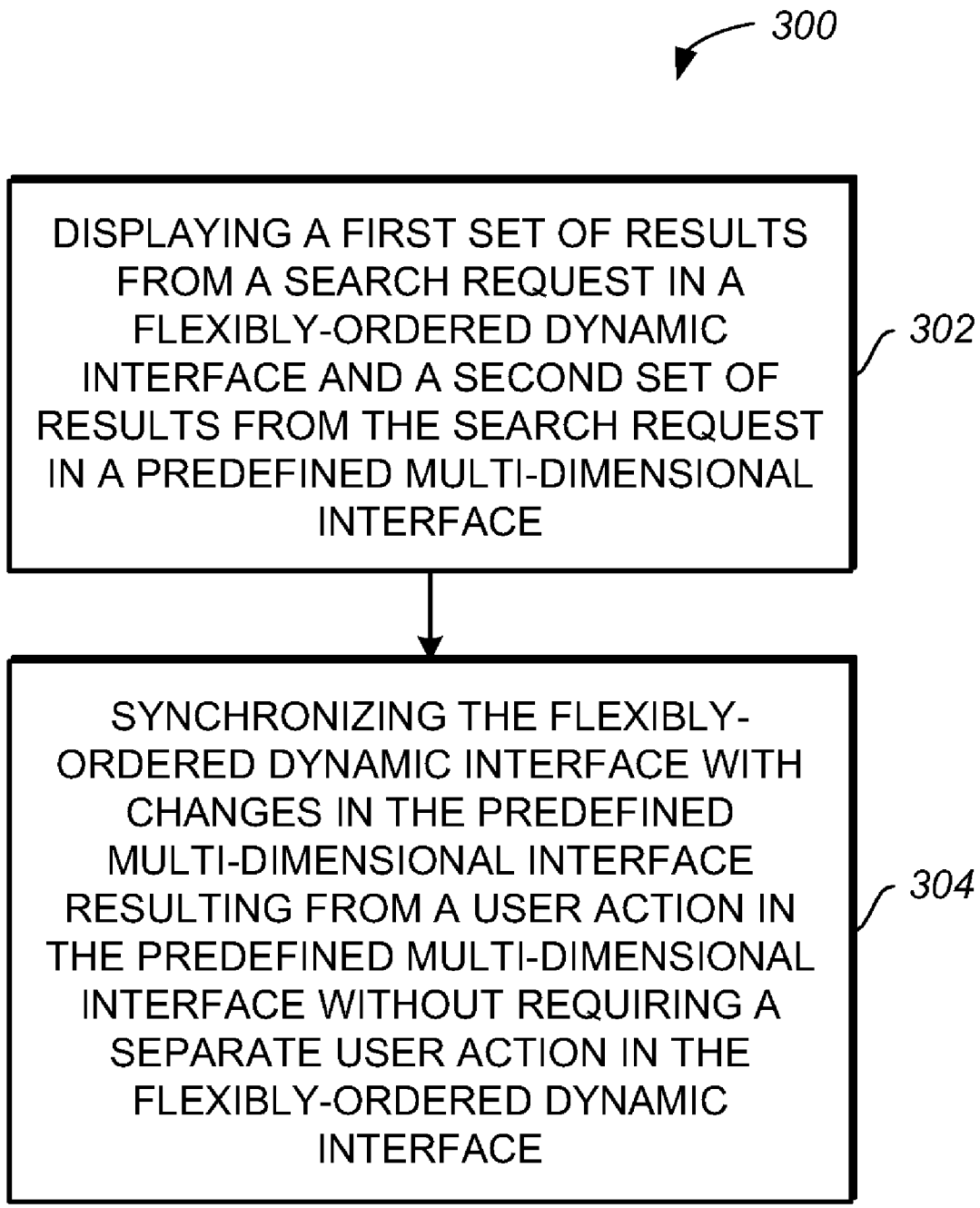
FIG. 3 is a process flow of a method for integrating flexibly-ordered dynamic and predefined multi-dimensional search interfaces according to an implementation of the invention.

Shown in FIG. 3 is a process 300 for integrating flexibly-ordered dynamic and predefined multi-dimensional search interfaces according to an implementation of the invention. At 302, a first set of results from a search request is displayed in a flexibly-ordered dynamic search interface and a second set of results from the search request is displayed in a predefined multi-dimensional search interface. In the implementation, the second set of results is correlated to (e.g., based on) the first set of results, the first set of results is retrieved from a first data source and the second set of results is retrieved from a second data source that is separate from the first data source. The first data source and the second data source may be created from a same data set or may be created from separate data sets that are correlated to one another (e.g., can be mapped from one to the other).

The flexibly-ordered dynamic search interface is a faceted interface and the predefined multi-dimensional search interface is an OLAP interface in one implementation. The second data source may be an interconnected-dimensional data structure, such as a cube, and the first data source may be an independent-dimensional data structure, such as a search index. With independent-dimensional data structures, only values from the same dimension can be aggregated. With interconnected-dimensional data structures, values of interconnected dimensions are available for aggregation. Data in the first data source and the second data source may be derived from or created from the same data set or multiple correlated data sets, which may be structured data, such as a database table, an Extensible Markup Language (XML) file, and so forth, or unstructured data, such as text files of, for instance, notes, contracts, and so forth.

At 304, in response to a user action in the predefined multi-dimensional search interface affecting a scope of the search request, the flexibly-ordered dynamic search interface is synchronized with changes in the predefined multi-dimensional search interface without requiring a separate user action in the flexibly-ordered dynamic search interface. In one implementation, the user action in the predefined multi-dimensional search interface is user selection of a drill-down operation, a drill-up operation, or a slice-and-dice operation.

A drill-down operation in the predefined multi-dimensional search interface is similar to a refinement of the search request. A drill-up operation is the opposite of a drill-down operation, i.e., a broadening of the search request. A slice-and-dice operation re-arranges data to enable viewing of the data from a different perspective.

Figure 4:
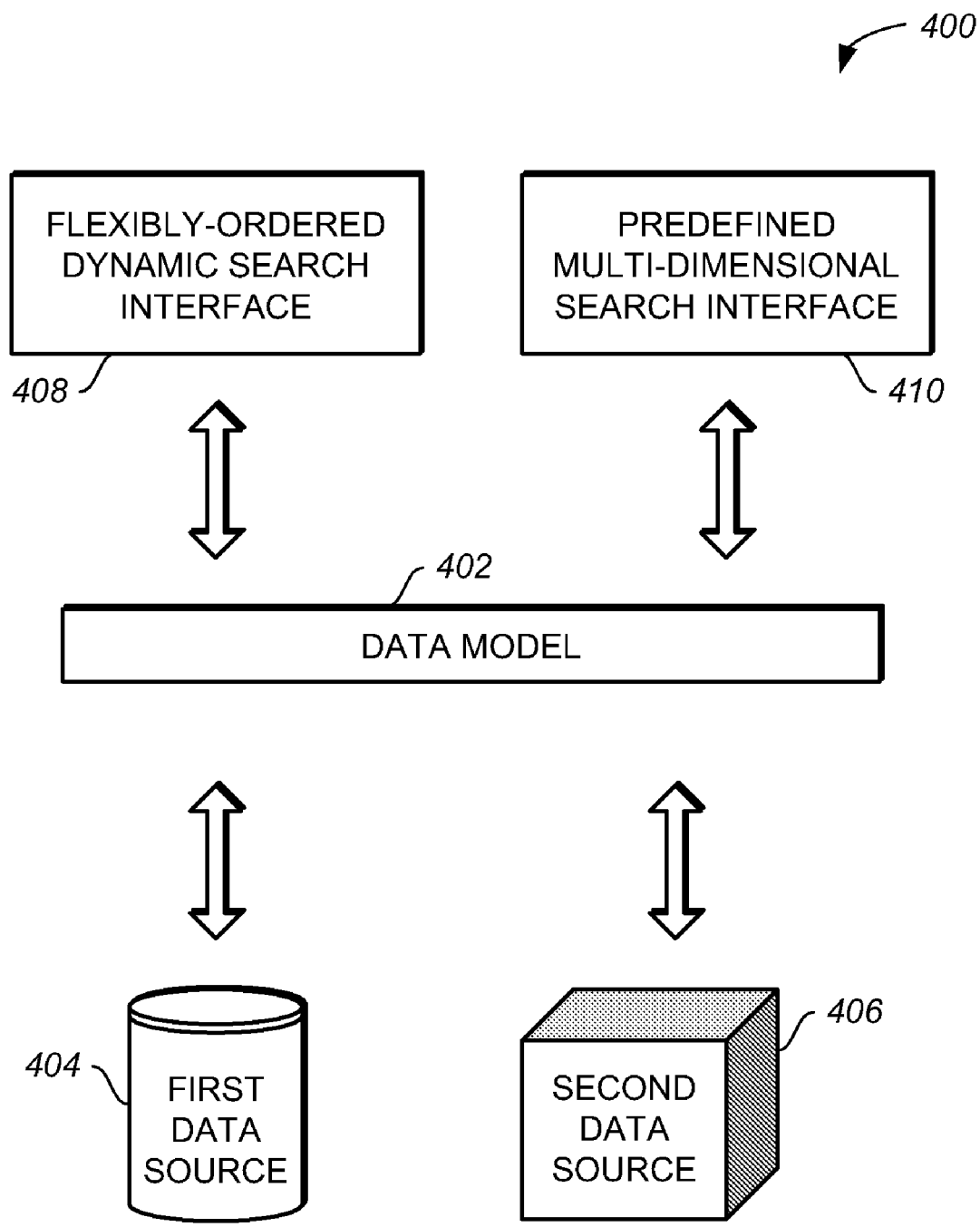
FIG. 4 shows a block diagram of a system according to an implementation of the invention.

FIG. 4 illustrates a system 400 according to an implementation of the invention. System 400 includes a data model 402, a first data source 404, a second data source 406, a flexibly-ordered dynamic search interface 408, and a predefined multi-dimensional search interface 410. In the implementation, data model 402 stores a first set of results from a search request and a second set of results from the search request correlated to the first set of results. The first set of results is retrieved from first data source 404 and the second set of results is retrieved from second data source 406.

Flexibly-ordered dynamic search interface 408 displays data from the first set of results and predefined multi-dimensional search interface 410 displays data from the correlated second set of results. The flexibly-ordered dynamic search interface 408 and the predefined multi-dimensional search interface 410 may be part of a single user interface (not shown). In one implementation, the first set of results and the second set of results stored in data model 402 is an aggregation or a subset of all of the results retrieved for the search request.

Responsive to a user action in the predefined multi-dimensional search interface 410 that affects a scope of the search request, the flexibly-ordered dynamic search interface 408 synchronizes with changes in the predefined multi-dimensional search interface 410 without requiring a separate user action in the flexibly-ordered dynamic search interface 408. System 400 may include other components, such as additional interfaces, interface controllers, search engines, data access layers, data provider layers, and so forth.

Figure 5:
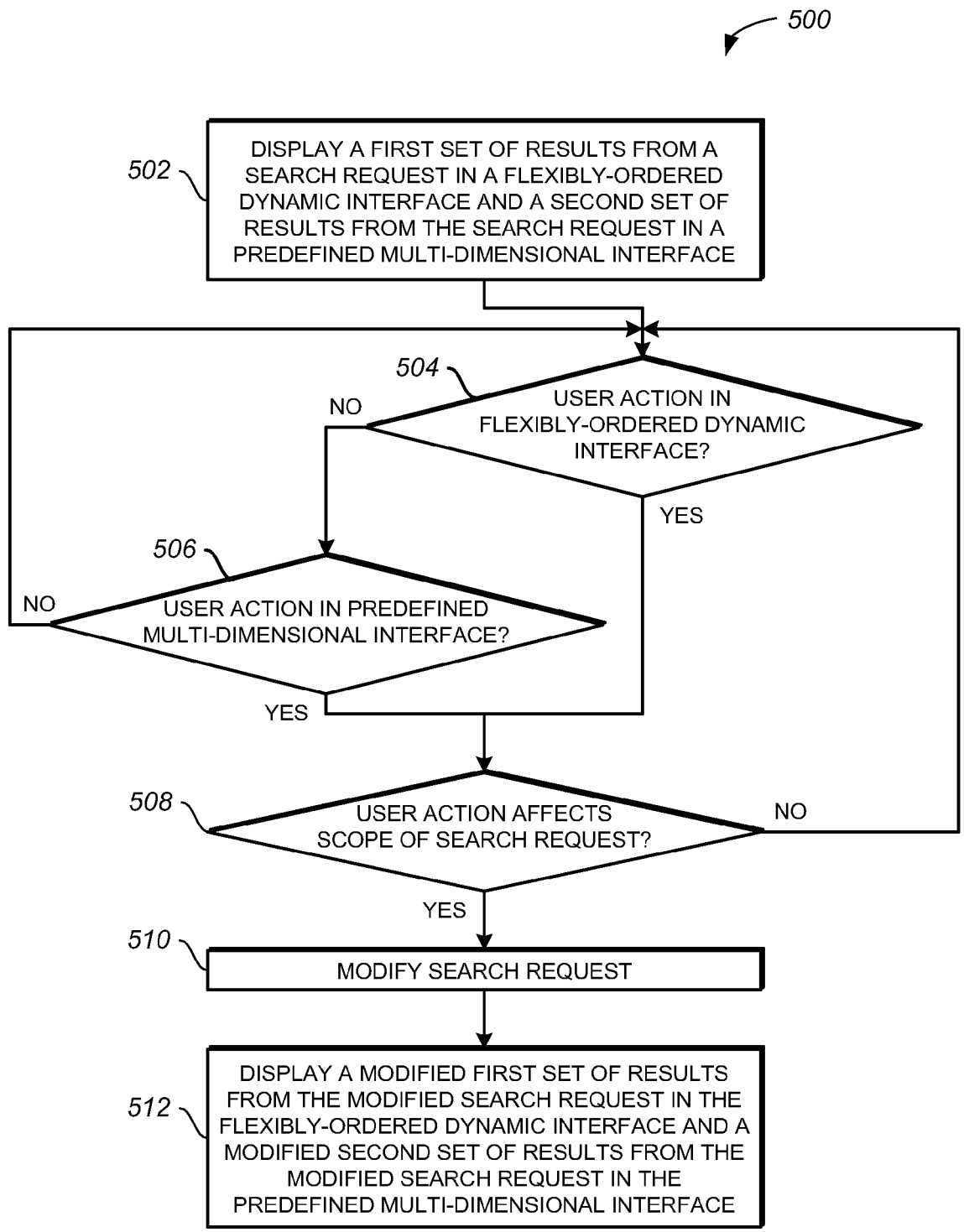
FIG. 5 illustrates a process flow of a method for integrating flexibly-ordered dynamic and predefined multi-dimensional search interfaces according to an implementation of the invention.

Depicted in FIG. 5 is a process 500 for integrating flexibly-ordered dynamic and predefined multi-dimensional search interfaces according to an implementation of the invention. At 502, a first set of results from a search request is displayed in a flexibly-ordered dynamic search interface and a second set of results from the search request is displayed in a predefined multi-dimensional search interface. The second set of results is correlated to the first set of results. For example, the second set of results may be based on or correspond to the first set of results.

A determination is made at 504 as to whether there has been a user action in the flexibly-ordered dynamic search interface. If there has not been a user action in the flexibly-ordered dynamic search interface, a determination is made at 506 as to whether there has been a user action in the predefined multi-dimensional search interface. Process 500 loops back to 504 if there has not been a user action in the predefined multi-dimensional search interface. Before looping back to 504, process 500 may wait a predetermined amount of time.

If there has been a user action in the flexibly-ordered dynamic search interface or the predefined multi-dimensional search interface, a determination is made at 508 as to whether the user action affects a scope of the search request since not all user actions may affect the scope of the search request. Process 500 returns back to 504 when the user action does not affect the scope of the search request. The search request is modified at 510 when the user action does affect the scope of the search request.

At 512, a modified first set of results from the modified search request is displayed in the flexibly-ordered dynamic search interface and a modified second set of results is displayed in the predefined multi-dimensional search interface. In one implementation, displaying the modified first set of results comprises updating a portion of the first set of results displayed in the flexibly-ordered dynamic search interface.

Figure 6:
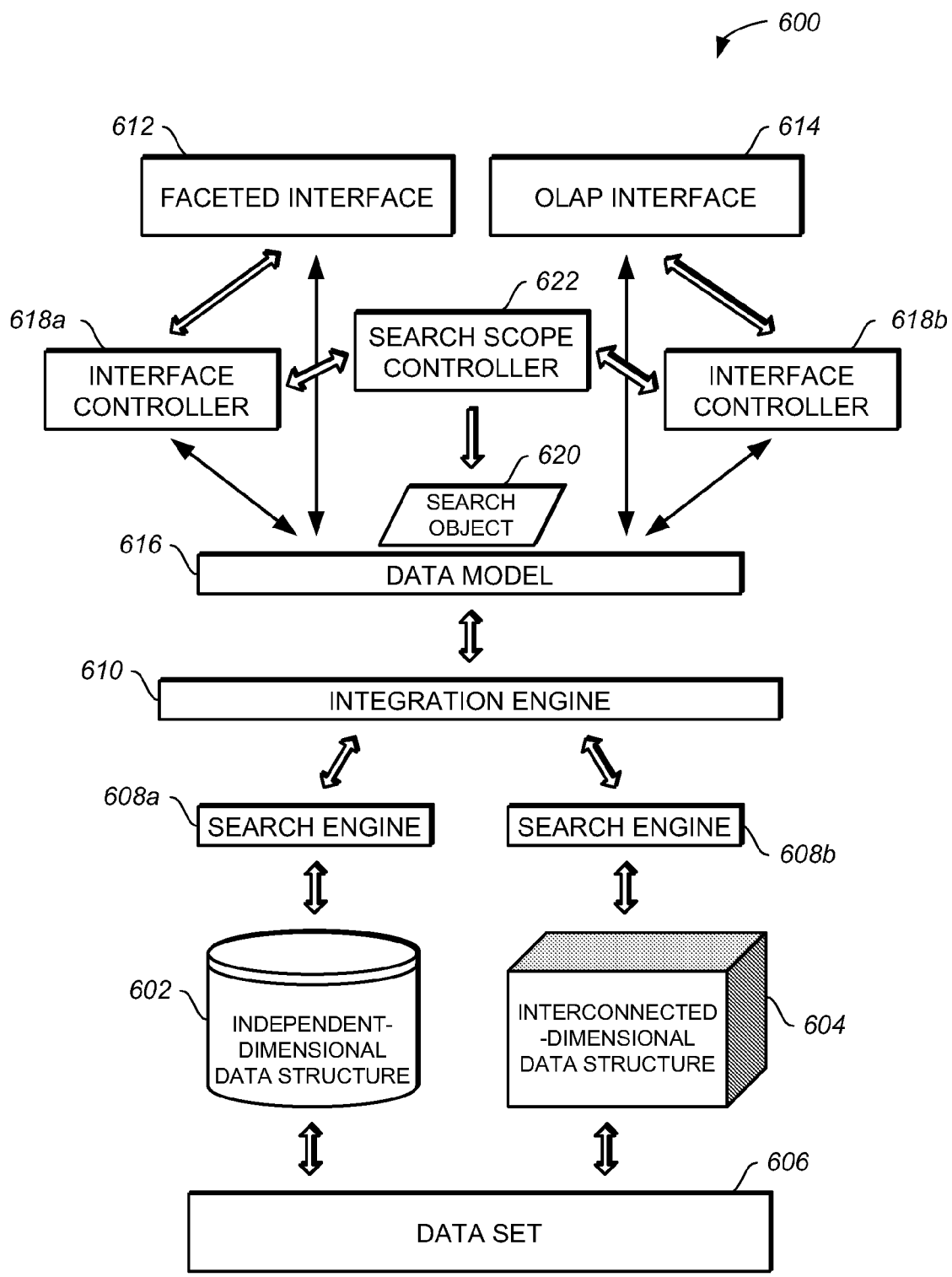
FIG. 6 depicts a block diagram of a system according to an implementation of the invention.

FIG. 6 shows a system 600 according to an implementation of the invention. System 600 includes an independent-dimensional data structure 602 and an interconnected-dimensional data structure 604. Independent-dimensional data structure 602 is a search index in one implementation. Both the independent-dimensional data structure 602 and the interconnected-dimensional data structure 604 are derived from or created from a data set 606, which can include different types of data. For instance, data set 606 may include database(s), XML files, text files, and/or other structured and unstructured data. In another implementation, independent-dimensional data structure 602 may be created from a first data set and interconnected-dimensional data structure 604 may be created from a second data set that is correlated to the first data set (e.g., data in the first data set can be mapped to data in the second data set and vice versa).

System 600 also includes search engines 608a and 608b, an integration engine 610, a faceted interface 612, and an OLAP interface 614. Search engine 608a can be used to search independent-dimensional data structure 602 and search engine 608b can be used to search interconnected-dimensional data structure 604. Integration engine 610 interfaces with both search engines 608a and 608b to retrieve results of a search request from independent-dimensional data structure 602 and interconnected-dimensional data structure 604. Retrieved results are stored in a data model 616.

Faceted interface 612 displays results retrieved from independent-dimensional data structure 602, which are stored in data model 616. OLAP interface 614 displays correlated results retrieved from interconnected-dimensional data structure 604, which are also stored in data model 616. In one implementation, the results stored in data model 616 may be limited to the results that will be displayed in interfaces 612 and 614. As a result, data model 616 may not include all of the results from the search request.

As shown in FIG. 6, interface controllers 618a and 618b are provided in system 600, one for each of the interfaces 612 and 614. Each of the interface controllers 618a and 618b can detect user actions in the respective interfaces 612 and 614 and determine whether a user action affects a scope of the search request. In response to a user action in the faceted interface 612 or the OLAP interface 614 affecting the scope of the search request, the corresponding interface controller 618a or 618b triggers a modification of the search request.

In the implementation of FIG. 6, a search object 620 is created to store the scope of the search request. A search scope controller 622 is also provided to control search object 620. Search scope controller 622 includes one or more methods that are operable to change the scope of the search request. Hence, interface controller 618a or 618b can trigger modification of the search request by calling the one or more methods to change the scope of the search request. After the scope of the search request in search object 620 is modified, search object 620 can be passed to integration engine 610 to retrieve results for the modified search request from independent-dimensional data structure 602 and interconnected-dimensional data structure 604 by issuing, for instance, a search and index application programming interface (SIAPI) query to search engine 608a and a multi-dimensional expression (MDX) query to search engine 608b.

Results retrieved from the modified search request are stored in data model 616. Thereafter, faceted interface 612 displays the modified results retrieved from independent-dimensional data structure 602 and OLAP interface 614 displays the modified results retrieved from interconnected-dimensional data structure 604. Hence, regardless of whether a user action occurs in the faceted interface 612 or in the OLAP interface 614, when the user action affects the scope of the search request, both interfaces will be updated without requiring a subsequent user action in the other interface. This allows users to better visualize the data to be analyzed since the interfaces 612 and 614 will no longer be susceptible to asynchronous behavior.

Figure 7A:
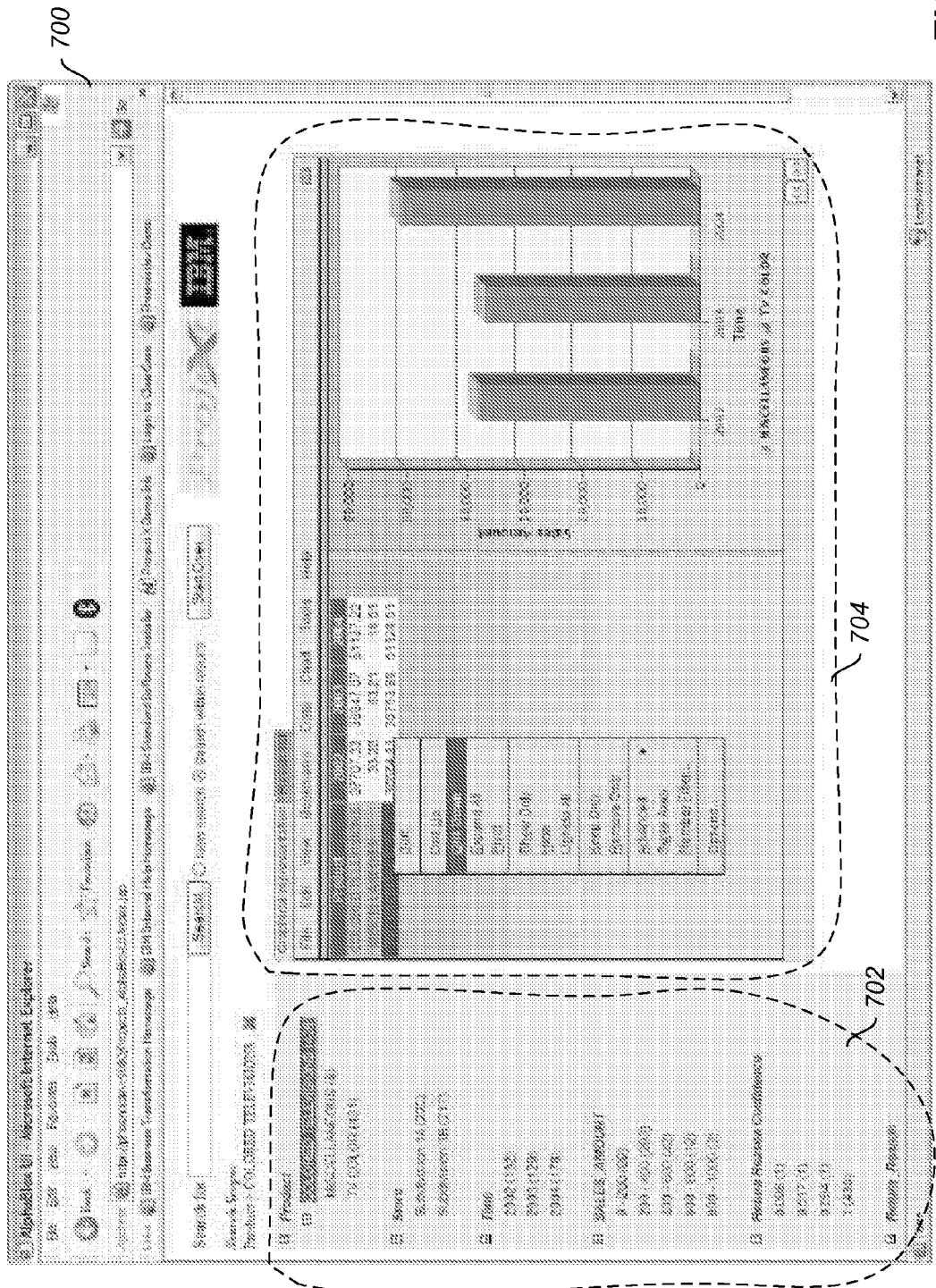
FIGS. 7A-7B are sample screenshots of an application according to an implementation of the invention.
Figure 7B:
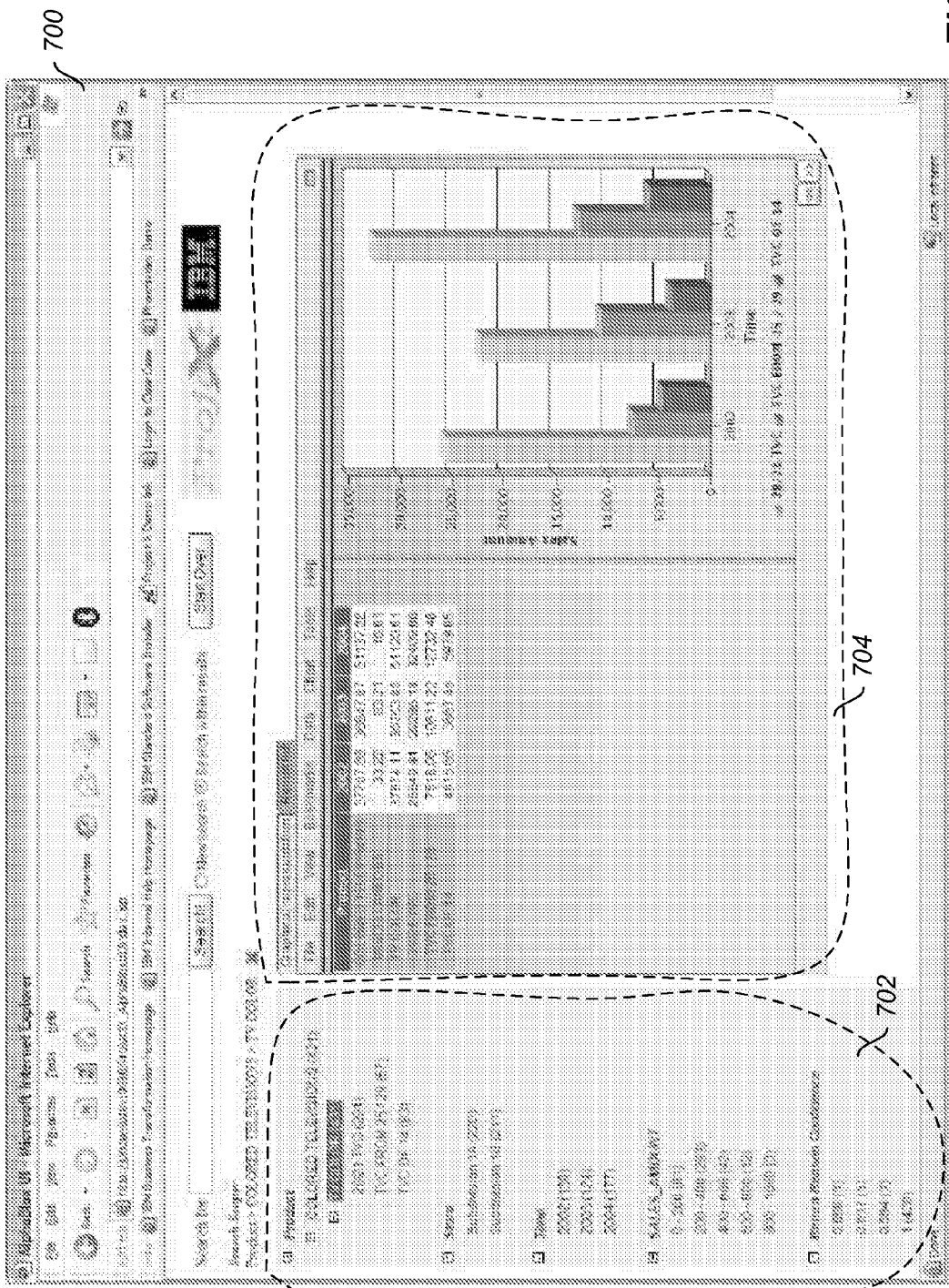

Illustrated in FIGS. 7A-7B are sample screenshots of an application 700 according to an implementation of the invention. Application 700 includes both a faceted interface 702 and an OLAP interface 704. In FIG. 7A, within faceted interface 702 and OLAP interface 704 are results from a search request for "COLORED TELEVISIONS." Many facets are displayed in faceted interface 702, including "Product," "COLORED TELEVISIONS," "MISCELLANEOUS," "TV COLOR," "Store," "Subdivision 1A," "Subdivision 1B," "Time," "2002," "2003," "2004," and so forth. Some of the facets, such as "COLORED TELEVISIONS," "MISCELLANEOUS," "TV COLOR," "Subdivision 1A," "Subdivision 1B," "2002," "2003," "2004," and so forth, are children of other facets and are sometimes referred to as child facets or sub-facets.

Adjacent to some of the facets in faceted interface 702 is a number in parenthesis. In the implementation, the number reflects a number of documents classified by the facet. The term document is used to refer to the smallest unit that will be returned as a result. Hence, a document can be, for instance, a text file, a row of data from a table, or an XML tagged data.

OLAP interface 704 displays graphical and table representations of results retrieved from an interconnected-dimensional data structure. As seen in FIG. 7A, a user has selected a drill down operation from "TV COLOR" in OLAP interface 704. Since the user action affects a scope of the search request, the search request is modified to be "COLORED TELEVISIONS>TV COLOR." Results from the modified search request are displayed in FIG. 7B. As illustrated in FIG. 7B, faceted interface 702 is updated to show sub-facets of the facet "TV COLOR." In addition, the graphical and table representations in OLAP interface 704 have been updated to show the additional results.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 8:
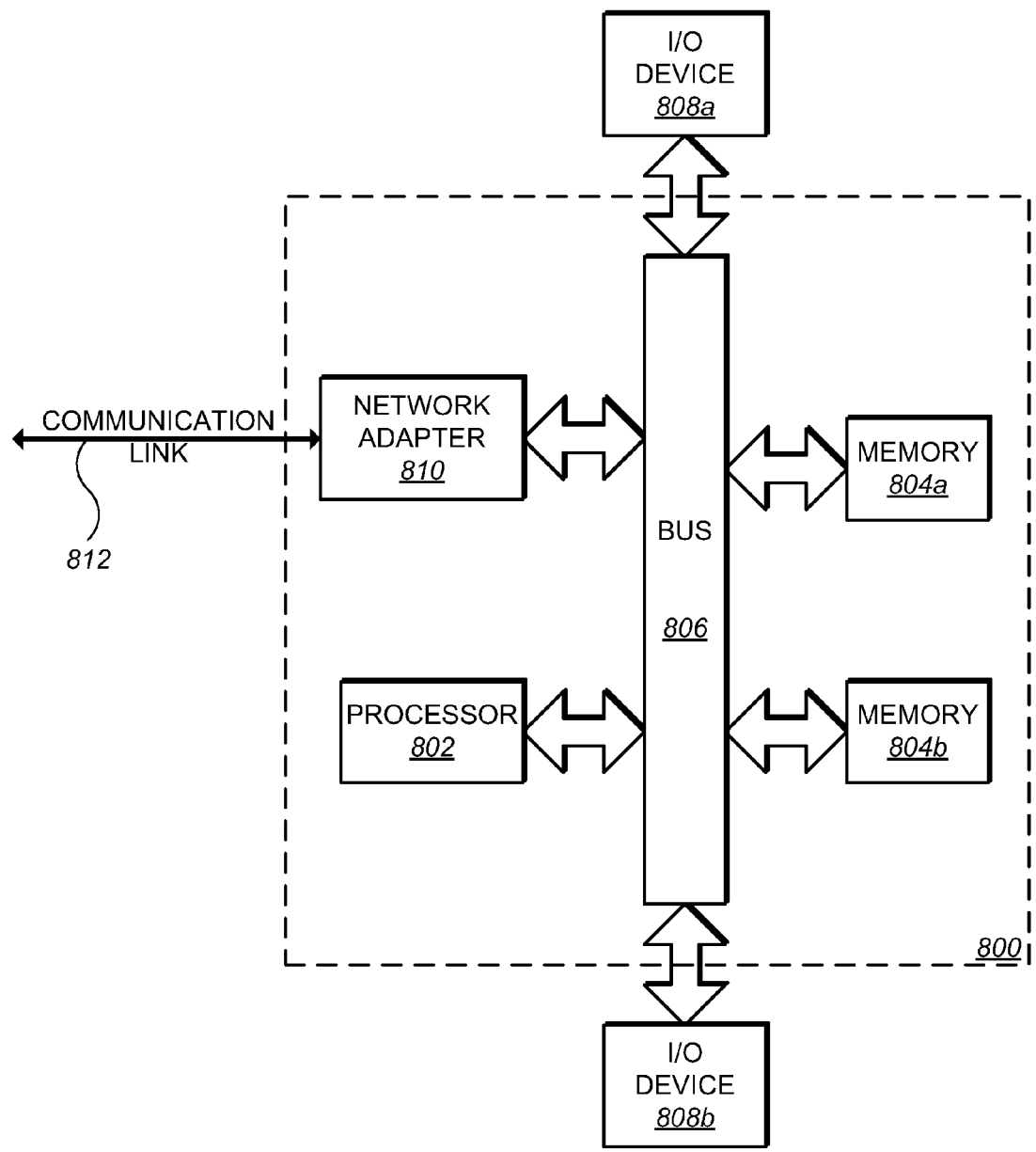
FIG. 8 shows a block diagram of a data processing system with which implementations of the invention can be implemented.

FIG. 8 depicts a data processing system 800 suitable for storing and/or executing program code. Data processing system 800 includes a processor 802 coupled to memory elements 804a-b through a system bus 806. In other implementations, data processing system 800 may include more than one processor and each processor may be coupled directly or indirectly to one or more memory elements through a system bus.

Memory elements 804a-b can include local memory employed during actual execution of the program code, bulk storage, and cache memories that provide temporary storage of at least some program code in order to reduce the number of times the code must be retrieved from bulk storage during execution. As shown, input/output or I/O devices 808a-b (including, but not limited to, keyboards, displays, pointing devices, etc.) are coupled to data processing system 800. I/O devices 808a-b may be coupled to data processing system 800 directly or indirectly through intervening I/O controllers (not shown).

In the implementation, a network adapter 810 is coupled to data processing system 800 to enable data processing system 800 to become coupled to other data processing systems or remote printers or storage devices through communication link 812. Communication link 812 can be a private or public network. Modems, cable modems, and Ethernet cards are just a few of the currently available types of network adapters.

While various implementations for integrating flexibly-ordered dynamic and predefined multi-dimensional search interfaces have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for integrating faceted and predefined multi-dimensional search interfaces, the method comprising:
    displaying a first set of results from a search request in a faceted search interface and a second set of results from the search request in a predefined multi-dimensional search interface, the second set of results correlating to the first set of results, the first set of results being retrieved from a first data source and the second set of results being retrieved from a second data source separate from the first data source, the first data source and the second data source being created from one of a same data set and correlated data sets, wherein both the faceted search interface and the predefined multi-dimensional search interface are configured to allow a user to modify a scope of the search request, wherein the faceted search interface includes a plurality of facets, each facet classifying the second set of results in a different manner and configured to allow a user to modify a scope of the search request pertaining to the respective facet, and wherein the predefined multi-dimensional search interface is further configured to display a modified second set of results responsive to a user action in the faceted search interface affecting a scope of the search request; and
    responsive to a user action in the predefined multi-dimensional search interface affecting a scope of the search request, synchronizing the faceted search interface with changes in the predefined multi-dimensional search interface resulting from the user action without requiring a separate user action in the faceted search interface.

2. The method of claim 1, wherein synchronizing the faceted search interface with changes in the predefined multi-dimensional search interface comprises:
    modifying the search request; and
    displaying a modified first set of results from the modified search request in the faceted search interface and a modified second set of results from the modified search request in the predefined multi-dimensional search interface, the modified second set of results correlating to the modified first set of results, the modified first set of results being retrieved from the first data source and the modified second set of results being retrieved from the second data source.

3. The method of claim 2, wherein displaying the modified first set of results comprises:
    updating a portion of the first set of results displayed in the faceted search interface.

4. The method of claim 1, wherein the predefined multi-dimensional search interface is an online analytical processing (OLAP) interface.

5. The method of claim 1, wherein the user action in the predefined multi-dimensional search interface is user selection of a drill-down operation, a drill-up operation, or a slice-and-dice operation.

6. The method of claim 1, wherein the first data source is an independent-dimensional data structure and the second data source is an interconnected-dimensional data structure.

7. The method of claim 1, wherein the faceted search interface and the predefined multi-dimensional search interface are part of a single user interface.

8. A system for integrating faceted and predefined multi-dimensional search interfaces, the system comprising:
    a data model storing a first set of results from a search request and a second set of results from the search request, the second set of results correlating to the first set of results, the first set of results being retrieved from a first data source and the second set of results being retrieved from a second data source separate from the first data source, the first data source and the second data source being created from one of a same data set and correlated data sets;
    a faceted search interface displaying data from the first set of results stored in the data model, wherein the faceted search interface is configured to allow a user to modify a scope of the search request, and wherein the faceted search interface includes a plurality of facets, each facet classifying the second set of results in a different manner and configured to allow a user to modify a scope of the search request pertaining to the respective facet; and
    a predefined multi-dimensional search interface displaying data from the second set of results stored in the data model, wherein the predefined multi-dimensional search interface is configured to allow a user to modify a scope of the search request, wherein the predefined multi-dimensional search interface is further configured to display a modified second set of results responsive to a user action in the faceted search interface affecting a scope of the search request, and wherein, responsive to a user action in the predefined multi-dimensional search interface affecting a scope of the search request, the faceted search interface synchronizes with changes in the predefined multi-dimensional search interface resulting from the user action without requiring a separate user action in the faceted search interface.

9. The system of claim 8, further comprising:
    an interface controller in communication with the predefined multi-dimensional search interface, the interface controller triggering a modification of the search request responsive to the user action in the predefined multi-dimensional search interface affecting the scope of the search request.

10. The system of claim 9, wherein responsive to modification of the search request,
    the data model stores a modified first set of results from the modified search request and a modified second set of results from the modified search request, the modified second set of results correlating to the modified first set of results, the modified first set of results being retrieved from the first data source and the modified second set of results being retrieved from the second data source;
    the faceted search interface displays data from the modified first set of results stored in the data model; and the predefined multi-dimensional search interface component displays data from the modified second set of results stored in the data model.

11. The system of claim 8, wherein the predefined multi-dimensional search interface is an online analytical processing (OLAP) interface.

12. The system of claim 8, wherein the user action in the predefined multi-dimensional search interface is user selection of a drill-down operation, a drill-up operation, or a slice-and-dice operation.

13. The system of claim 8, wherein the first data source is an independent-dimensional data structure and the second data source is an interconnected-dimensional data structure.

14. A computer program product comprising a computer readable medium, the computer readable medium including a computer readable program for integrating faceted and predefined multi-dimensional search interfaces, wherein the computer readable program when executed on a computer causes the computer to:

display a first set of results from a search request in a faceted search interface and a second set of results from the search request in a predefined multi-dimensional search interface, the second set of results correlating to the first set of results, the first set of results being retrieved from a first data source and the second set of results being retrieved from a second data source separate from the first data source, the first data source and the second data source being created from one of a same data set and correlated data sets, wherein both the faceted search interface and the predefined multi-dimensional search interface are configured to allow a user to modify a scope of the search request, wherein the faceted search interface includes a plurality of facets, each facet classifying the second set of results in a different manner and configured to allow a user to modify a scope of the search request pertaining to the respective facet, and wherein the predefined multi-dimensional search interface is further configured to display a modified second set of results responsive to a user action in the faceted search interface affecting a scope of the search request; and responsive to a user action in the predefined multi-dimensional search interface affecting a scope of the search request, synchronize the faceted search interface with changes in the predefined multi-dimensional search interface resulting from the user action without requiring a separate user action in the faceted search interface.

15. The computer program product of claim 14, wherein synchronize the faceted search interface with changes in the predefined multi-dimensional search interface comprises:

modify the search request; and display a modified first set of results from the modified search request in the faceted search interface and a modified second set of results from the modified search request in the predefined multi-dimensional search interface, the modified second set of results correlating to the modified first set of results, the modified first set of results being retrieved from the first data source and the modified second set of results being retrieved from the second data source.

16. The computer program product of claim 14, wherein display the modified first set of results comprises:

update a portion of the first set of results displayed in the faceted search interface.

17. The computer program product of claim 14, wherein the predefined multi-dimensional search interface is an online analytical processing (OLAP) interface.

18. The computer program product of claim 14, wherein the user action in the predefined multi-dimensional search interface is user selection of a drill-down operation, a drill-up operation, or a slice-and-dice operation.

19. The computer program product of claim 14, wherein the first data source is an independent-dimensional data structure and the second data source is an interconnected-dimensional data structure.

* * * * *